United States Patent
Harasaki

(10) Patent No.: US 9,336,684 B2
(45) Date of Patent: May 10, 2016

(54) TRAVELLING VEHICLE SYSTEM AND METHOD FOR CONTROLLING TRAVEL OF TRAVELLING VEHICLE IN CURVED SECTION

(71) Applicant: Murata Machinery, Ltd., Kyoto-shi, Kyoto (JP)

(72) Inventor: Kazumi Harasaki, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

(21) Appl. No.: 14/403,735

(22) PCT Filed: Apr. 19, 2013

(86) PCT No.: PCT/JP2013/061594
§ 371 (c)(1),
(2) Date: Nov. 25, 2014

(87) PCT Pub. No.: WO2013/179802
PCT Pub. Date: Dec. 5, 2013

(65) Prior Publication Data
US 2015/0187218 A1    Jul. 2, 2015

(30) Foreign Application Priority Data

May 28, 2012    (JP) ................. 2012-120563

(51) Int. Cl.
*G08G 1/00* (2006.01)
*G05D 1/02* (2006.01)
*G01C 21/34* (2006.01)

(52) U.S. Cl.
CPC ...... *G08G 1/22* (2013.01); *G01C 21/34* (2013.01); *G05D 1/0289* (2013.01); *G05D 1/0297* (2013.01); *G05D 2201/0213* (2013.01)

(58) Field of Classification Search
CPC ....... G01C 21/34; G05D 1/02; G05D 1/0289; G05D 1/0297; G05D 2201/0213; G08G 1/22; G06F 7/00; B60Y 2200/30; B60Y 2200/60
See application file for complete search history.

(56) References Cited

U.S. PATENT DOCUMENTS

| | | | | |
|---|---|---|---|---|
| 5,267,173 A | * | 11/1993 | Tanizawa | G05D 1/0261 104/88.03 |
| 2007/0016366 A1 | * | 1/2007 | Nagasawa | G05D 1/0212 701/413 |
| 2008/0147306 A1 | * | 6/2008 | Hayashi | G08G 1/042 701/117 |
| 2010/0228389 A1 | * | 9/2010 | Hayashi | G05D 1/0212 700/229 |
| 2011/0106341 A1 | * | 5/2011 | Kinoshita | G07C 5/008 701/2 |

FOREIGN PATENT DOCUMENTS

| | | |
|---|---|---|
| JP | 7-81881 A | 3/1995 |
| JP | 2006-137337 A | 6/2006 |
| TW | 200538896 A | 12/2005 |

* cited by examiner

*Primary Examiner* — Jerrah Edwards
*Assistant Examiner* — Tamara Weber
(74) *Attorney, Agent, or Firm* — Keating & Bennett, LLP

(57) ABSTRACT

A ground controller in a travelling vehicle system stores travel permissions for a curved section that are provided to travelling vehicles, and deletes the travel permissions when the travelling vehicles leave the curved section. When a request for a permission to travel in the curved section is received from a travelling vehicle, the ground controller references the memory, provides a first travel permission if a permission to travel has not been provided to another travelling vehicle, and provides a low-order travel permission that permits travel with a lower speed than the first travel permission if a permission to travel has been provided to another travelling vehicle.

7 Claims, 5 Drawing Sheets

F I G. 1
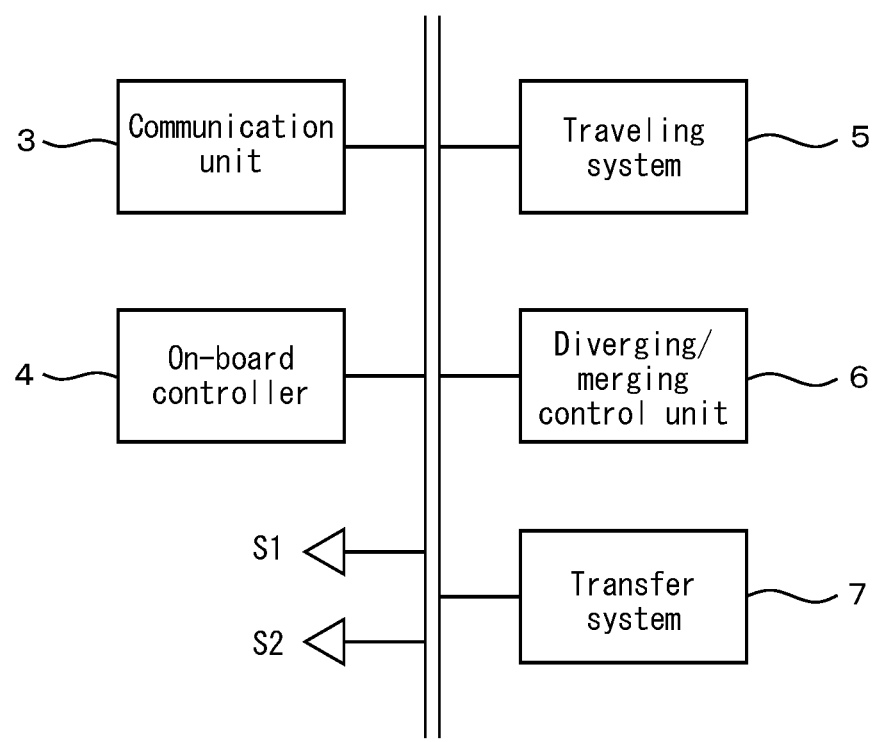

F I G. 3
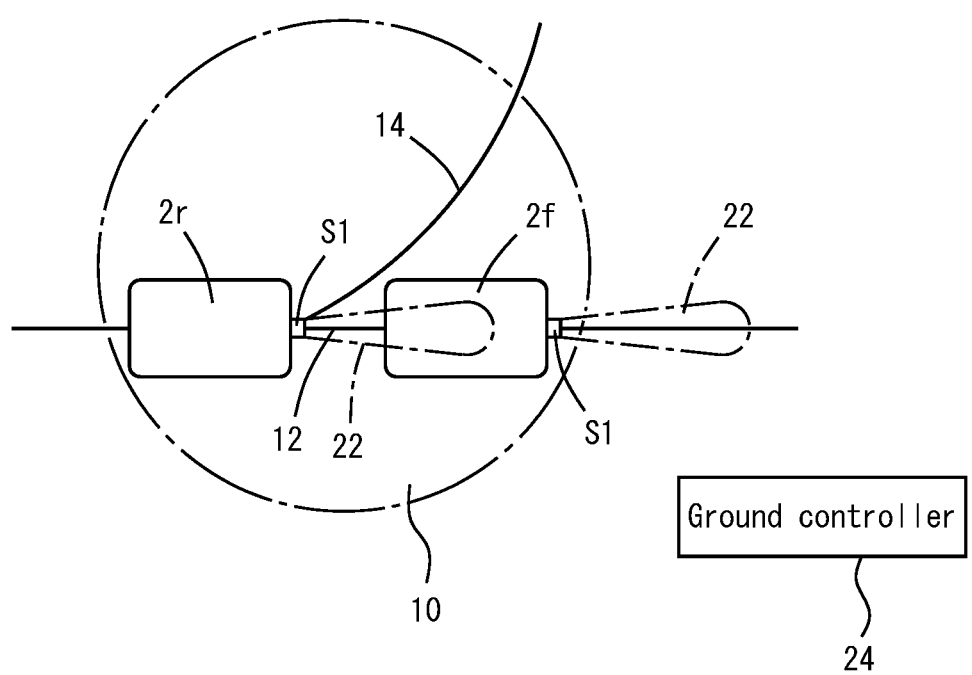

F I G. 5
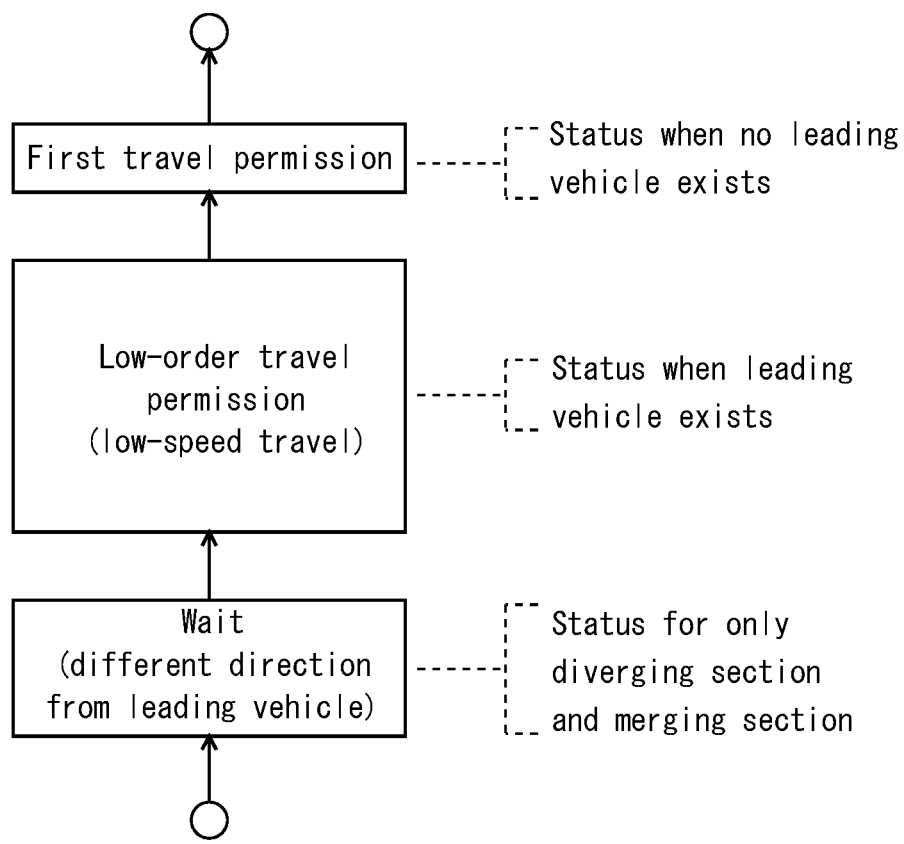

TRAVELLING VEHICLE SYSTEM AND METHOD FOR CONTROLLING TRAVEL OF TRAVELLING VEHICLE IN CURVED SECTION

BACKGROUND OF THE INVENTION

1. Field of the Invention

The present invention relates to a travelling vehicle system and a method of controlling the travelling of travelling vehicles in curved sections, and in particular relates to blocking in curved sections.

2. Description of the Related Art

In a system of travelling vehicles such as overhead travelling vehicles or automated guided vehicles, the travelling vehicles include obstacle sensors and avoid interference autonomously. Detecting a leading vehicle is difficult in a diverging section, a merging section, and the like, and therefore exclusion control is performed by a ground controller to limit the number of travelling vehicles travelling in a diverging section, a merging section, or the like at the same time to one vehicle (see, for example, WO 2009/142051A). However, this control is inefficient since the number of travelling vehicles that can pass through the diverging section or the merging section per unit time decreases. In view of this, consideration has been provided to eliminating the need for exclusion control by providing travelling vehicles with an obstacle sensor for curved travel (see, for example, JP 2011-165025A)

However, detecting a leading vehicle in a curved section with an obstacle sensor is not easy. Firstly, since the leading vehicle is travelling along a curve, the monitoring range spreads out like a fan. Secondly, when detecting reflected light from a leading vehicle, the direction of the reflected light changes because the direction of the leading vehicle changes as it travels along a curve. For this reason, the obstacle sensor for curved travel needs to be adjusted finely, and there are cases where the detection of a leading vehicle is delayed if there is deviation in the adjustment.

SUMMARY OF THE INVENTION

Preferred embodiments of the present invention reliably prevent interference between travelling vehicles in curved sections, and enable travelling vehicles to efficiently travel in curved sections.

A travelling vehicle system according to a preferred embodiment of the present invention allows travelling vehicles to travel in sections including a curve in a travelling route under control of a ground controller, wherein the travelling vehicles travel along the travelling route, include an obstacle sensor for curved travel and a communication unit configured to communicate with the ground controller, and are configured or programmed to make a request for a travel permission to the ground controller via the communication unit before travelling in a section including a curve, the ground controller including a memory in which travel permissions for the section that have already been provided to the travelling vehicles are stored, and from which the travel permissions are deleted when the travelling vehicles leave the section; and a travel permission unit configured or programmed to, when a request for a permission to travel in the section is received from a travelling vehicle, reference the memory, provide a first travel permission if a permission to travel has not been provided to another travelling vehicle, and provide a low-order travel permission that permits travel with a lower speed than the first travel permission if a permission to travel has been provided to another travelling vehicle.

A method of controlling travelling of travelling vehicles in curved sections according to another preferred embodiment of the present invention allows travelling vehicles to travel in a section including a curve in a travelling route under control of a ground controller, wherein the travelling vehicles make a request for a travel permission to the ground controller before travelling in the section including a curve, monitor an obstacle in the section with an obstacle sensor for curved travel, and stop or perform speed reduction to avoid interference if an obstacle is detected, and the ground controller is configured or programmed to store travel permissions for the sections that are already provided to the travelling vehicles in a memory, and delete the travel permissions from the memory when the travelling vehicles leave the section, and when a request for a permission to travel in the section is received from a travelling vehicle, the ground controller references the memory, provides a first travel permission if a permission to travel has not been provided to another travelling vehicle, and provides a low-order travel permission that permits travel with a lower speed than the first travel permission if a permission to travel has been provided to another travelling vehicle.

With this preferred embodiment of the present invention, multiple travelling vehicles are able to travel in a section including a curve at the same time, and it is possible to prevent interference between travelling vehicles in the curved section. Also, since multiple travelling vehicles are able to travel in a section including a curve at the same time, if the travelling vehicle is a carrier vehicle configured to carry articles, for example, the article carrying efficiency improves. A section that includes a curve may be a simple curved section, or a diverging section, a merging section, or the like. Also, there may be one type of low-order travel permission, or multiple types. The travelling vehicle preferably is a carrier vehicle configured to carry articles, such as an overhead travelling vehicle or an automated guided vehicle. In this description, the descriptions regarding the travelling vehicle system apply as-is to the method of controlling the travelling of travelling vehicles in a curved section as well.

It is preferable that the travel permission unit is configured or programmed to, when the travelling vehicle farthest ahead in the section leaves the section, change the travel permission for the travelling vehicle immediately subsequent to the farthest ahead travelling vehicle in the section to the first travel permission. According to this, the subsequent travelling vehicle is able to travel more quickly.

Also, it is preferable that the ground controller further includes a storage device configured to store, for each travelling vehicle, a frequency of interference with a leading vehicle or rapid speed reduction in the section, and the travel permission unit preferably is configured or programmed to, when giving the low-order travel permission, provide a travel permission with a lower speed when the frequency is high, and provide a travel permission with a higher speed when the frequency is low. As a result, travelling vehicles are able to travel at speeds that correspond to a history of the detection of leading vehicles in curved sections for each travelling vehicle, such as the total frequency of interference with a leading vehicle and the total frequency of rapid speed reduction to avoid interference with a leading vehicle.

It is preferable that the section is a diverging section or a merging section, and the travel permission unit is configured or programmed to not provide the low-order travel permission nor the first travel permission when a request for a travel permission to a different side from the leading travelling vehicle in the diverging section is received, or when a request for a travel permission from a different side from the leading travelling vehicle in the merging section is received. If the travelling direction of the following vehicle is different from the leading vehicle, it is particularly difficult to detect the leading vehicle, and therefore interference between travelling vehicles is more reliably prevented by not giving the low-order travel permission in such a case.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 is a block diagram of an overhead travelling vehicle.

FIG. 3 is a diagram showing a state in which two travelling vehicles travel in a straight ahead direction in a diverging section.

FIG. 5 is a diagram showing transitions in statuses of travelling vehicles in a curved section.

DETAILED DESCRIPTION OF THE PREFERRED EMBODIMENTS

Figure 2:
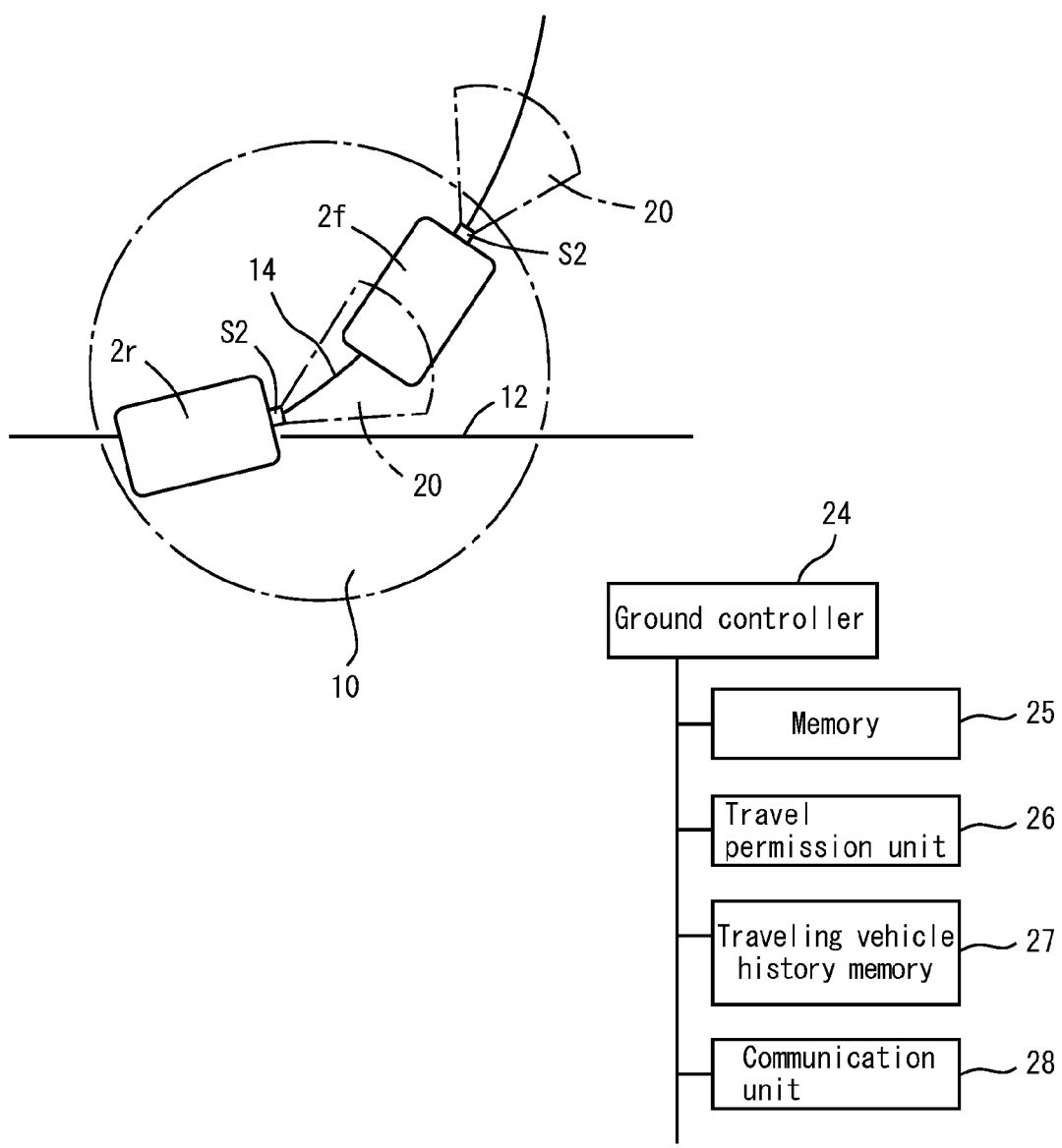
FIG. 2 is a diagram showing a state in which two travelling vehicles diverge in a curved direction in a diverging section.

The following describes various preferred embodiments of the present invention. The scope of the present invention is determined by the claims, and is intended to be construed in accordance with the understanding of a person skilled in the art with reference to the description of various preferred embodiments of the present invention and well-known techniques in the field of the present invention.

A travelling vehicle system according to a preferred embodiment is shown in FIGS. 1 to 5. Although any type of travelling vehicles may be used, such as overhead travelling vehicles or automated guided vehicles, overhead travelling vehicles 2 shown in FIG. 1 are preferably included in this preferred embodiment. The overhead travelling vehicles 2 travel along a travelling rail, which is an example of a travelling route, and the travelling rail includes curved sections. Since diverging sections and merging sections include a curve, examples of the curved sections include not only simple curved sections, but also diverging sections and merging sections. The overhead travelling vehicles 2 include two types of obstacle sensors S1 and S2 configured to monitor leading travelling vehicles ahead, and the obstacle sensor S1 for straight ahead travel detects leading vehicles that are ahead in the straight ahead direction, whereas the obstacle sensor S2 for curved travel detects leading vehicles that are ahead in a curved direction in a fan-shaped range.

In the obstacle sensor S2 for curved travel, the central direction of the fan, the central angle of the fan (angle between the two ends of the fan), and the radius of the fan are changed within the range of necessity to monitor the area ahead. The obstacle sensors S1 and S2 preferably are constituted by laser ranging sensors, ultrasonic sensors, or the like, and in general, adjustment of the obstacle sensor S1 for straight ahead travel is easy, whereas the obstacle sensor S2 for curved travel requires fine adjustment, and there are cases where the detection of leading vehicles is delayed if there is deviation in the adjustment. For example, with a laser ranging sensor, a distance is detected based on the time required for laser light reflected by a leading vehicle to return to the following vehicle. If the leading vehicle is travelling straight ahead, it is possible to detect light that was perpendicularly or substantially perpendicularly incident on the body of the leading vehicle and then reflected perpendicularly or substantially perpendicularly. However, in a curved section, the directions between the bodies of the leading vehicle and the following vehicle face are different, and therefore weak reflected light is detected. For this reason, detecting a leading vehicle is difficult, and there are cases where detection is delayed until the inter-vehicle distance with the leading vehicle is unusually short.

With the overhead travelling vehicle 2, when an obstacle such as another overhead travelling vehicle ahead is detected by the obstacle sensor S1 or S2, interference is avoided by normal speed reduction, rapid speed reduction, stopping, or the like. Even in a situation in which the inter-vehicle distance is excessively short, if the leading vehicle and the following vehicle are travelling at the same speed, for example, interference can be avoided if the following vehicle reduces its speed rapidly or stops. In view of this, the frequency of rapid speed reduction and stopping indicates the frequency of occurrence of a situation in which the distance to another overhead travelling vehicle ahead is excessively short or the like. Here, the frequency preferably is determined as the ratio of the number of speed reductions or stops to the total travel distance, total number of trips, or the like. This frequency indicates the reliability of the obstacle sensor S2 for curved travel for each overhead travelling vehicle 2.

As shown in FIG. 1, the overhead travelling vehicle 2 includes a communication unit 3, communicates with a communication unit 28 of a ground controller 24 in FIGS. 2 and 3, and travels under control of the ground controller 24. An on-board controller 4 controls units of the overhead travelling vehicle 2. A travelling system 5 preferably includes a servomotor, a controller for the servomotor, and the like, and causes the overhead travelling vehicle 2 to travel. A diverging/merging control unit 6 preferably includes a retractable guide roller mechanism, and is configured or programmed to control the travelling direction in diverging sections and merging sections of the travelling rail. Note that automated guided vehicles travel along a predetermined travelling route, and the travelling route includes curved sections that are simple curved sections or portions of diverging sections or merging sections. In the case of automated guided vehicles, a steering portion is provided in place of the diverging/merging control unit 6. A transfer system 7 preferably includes a hoist, a SCARA arm, a slide fork, or the like, but does not need to be provided.

FIG. 2 shows the configuration of the ground controller and a situation in which overhead travelling vehicles are travelling toward a curve side 14 in a diverging section 10. The ground controller 24 includes a memory 25 and stores the IDs of overhead travelling vehicles that have been provided travel permissions for the diverging section 10 or the like and the types of travel permissions. Note that these pieces of data are sometimes called blocking data. Since the travelling route of the overhead travelling vehicles 2 includes multiple diverging sections, merging sections, and simple curved sections, blocking data is stored for each individual section. These sections are sometimes called curved sections in view of the fact that they include a curve, and are sometimes called blocking areas in view of the fact that exclusion control is performed.

A travel permission unit 26 references the blocking data and provides overhead travelling vehicles travel permissions for curved sections, and there are two types of travel permissions, namely a first travel permission for the leading vehicle farthest ahead in a section and a low-order travel permission for following vehicles. Also, each overhead travelling vehicle transmits, to the travel permission unit 26, its overhead travelling vehicle ID, the ID of the curved section for which a travel permission is requested, and a request for a travel permission. In the case of a diverging section, the overhead travelling vehicle also notifies the direction in which it will leave the diverging section, and in the case of a merging section, the overhead travelling vehicle also notifies the direction in which it will enter the merging section. Also, when an overhead travelling vehicle leaves a blocking area, the travel permission unit 26 deletes the blocking permission (travel permission) for the travelling vehicle that left from the blocking data in the memory 25.

If the travelling vehicle that left was the travelling vehicle farthest ahead in the blocking area, the travel permission for the subsequent overhead travelling vehicle is raised from the low-order permission to the first permission. A travelling vehicle history memory 27 stores a history of the number of times that overhead travelling vehicles have experienced interference with a leading overhead travelling vehicle or rapidly reduced their speed in a blocking area, as well as the total travelling distance, the total travelling time, the total number of trips, and the like of the overhead travelling vehicles. Note that the number of times that interference or rapid speed reduction occurred is counted based on reporting by the overhead travelling vehicles. The ratio of the number of times that interference or rapid speed reduction occurred to the total travelling distance or the like indicates the precision of the adjustment of the obstacle sensor for curved travel. The ground controller 24 is configured or programmed to include a communication unit 28, and communicates with the communication unit 3 of the overhead travelling vehicle 2.

In the diverging section 10, the travelling rail diverges to a straight ahead side 12 and a curve side 14. If the number of overhead travelling vehicles 2 that can enter the diverging section 10 at the same time is limited to one vehicle, the diverging section 10 becomes a cause for congestion. If the obstacle sensors S2 for diverging are relied on, and multiple overhead travelling vehicles 2 are allowed to enter the diverging section 10 at the same time, there is possibility of collisions or the like occurring. Note that 20 indicates the monitoring range of the obstacle sensor S2, and there are cases where detection is delayed depending on the adjustment that was performed.

In view of this, multiple overhead travelling vehicles 2 are allowed to enter the diverging section 10 at the same time, and interference between two overhead travelling vehicles 2 is prevented by monitoring the leading vehicle 2f with the obstacle sensor S2 of the following vehicle 2r. A limitation is placed on the travelling of the following vehicle 2r to cause it to travel at a lower speed than the leading vehicle 2f. By doing this, even if detection by the obstacle sensor S2 is delayed, the leading vehicle 2f can be detected before interference occurs. Note that the obstacle sensor S2 is configured to reliably detect the leading vehicle 2f if the leading vehicle 2f is located immediately ahead, but if the leading vehicle 2f is located far away, the obstacle sensor S2 cannot detect the leading vehicle 2f until it has come close. If interference is avoided in this way, the number of times that the following vehicle 2r performs rapid speed reduction decreases, and it is possible to avoid the application of shock to articles during transport. Note that when the leading vehicle 2f leaves the diverging section 10, the following vehicle 2r becomes the leading vehicle in the diverging section 10, and the travel permission thereof is changed to the first travel permission.

FIG. 3 shows a situation in which the leading vehicle 2f and the following vehicle 2r are both travelling toward the straight ahead side 12 in the diverging section 10. Note that since the leading vehicle 2f and the following vehicle 2r are both travelling straight ahead in FIG. 3, travel control for curved sections is not applied. 22 indicates the monitoring range of the obstacle sensor S1 for straight ahead travel, and the detection reliability is high in this range. In view of this, the leading vehicle 2f and the following vehicle 2r are both permitted to travel in the diverging section 10 at the speed limit for the straight ahead side. This is similar to giving the first travel permission to both the leading vehicle 2f and the following vehicle 2r. Note that it is difficult for a following vehicle that is travelling straight ahead to detect a leading vehicle that is diverging, and it is difficult for a following vehicle that is diverging to detect a leading vehicle that is travelling straight ahead. In view of this, a following vehicle that will travel in a different diverging/straight ahead direction from the leading vehicle is not permitted to enter the diverging section 10. Note that if the monitoring range of the obstacle sensor S2 for diverging travel is widened to be able to detect a leading vehicle having a different travelling direction, this restriction is not necessary.

Although the diverging section 10 is shown in FIGS. 2 and 3, the merging section also has a distinction between merging from the curve side and merging from the straight ahead side, and multiple overhead travelling vehicles 2 are able to travel in the merging section at the same time with the same control. The exits of the diverging section 10 are not limited to being the straight ahead side 12 and the curve side 14, and there are cases where the two exits are both curves. The same applies to the merging section as well, and there are cases where the two entrances are both curves. In these cases as well, control similar to FIG. 2 is performed such that multiple overhead travelling vehicles are allowed to enter a diverging section or a merging section at the same time if the travelling directions in the diverging section or the merging section are the same, and the speed or the like is limited for the following overhead travelling vehicle.

It is inefficient if overhead travelling vehicles 2 travelling along a travelling rail that includes a curved section are uniformly requested to travel at a reduced speed. Also, it is similarly inefficient if the number of overhead travelling vehicles 2 that can travel in one curved section is limited to one vehicle. In contrast, if control similar to FIG. 2 is performed in a curved section, multiple overhead travelling vehicles are able to travel in the curved section at the same time, and it is also possible to avoid interference between overhead travelling vehicles.

Figure 4:
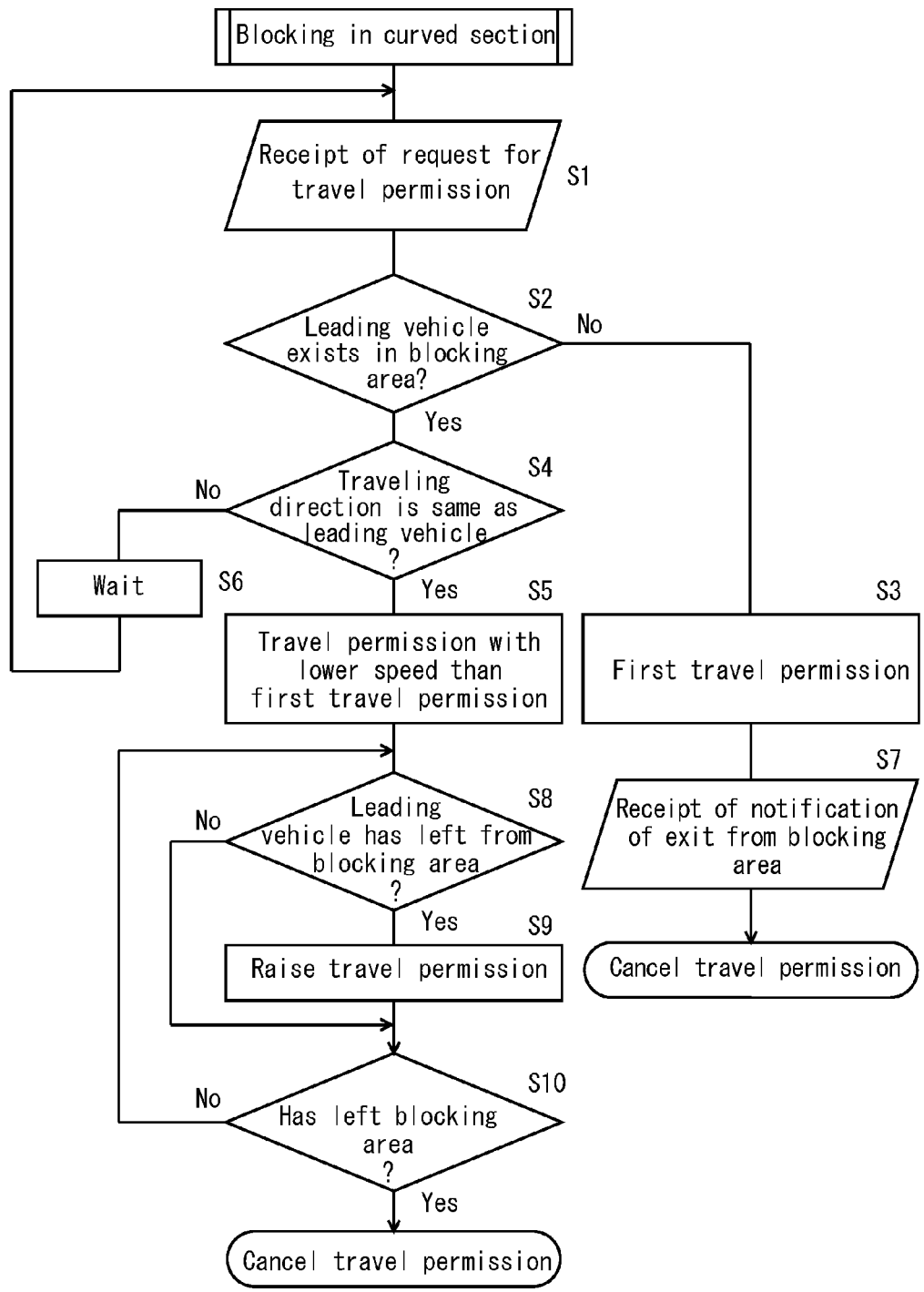
FIG. 4 is a flowchart showing an algorithm for blocking in a curved section in a travelling vehicle system according to a preferred embodiment of the present invention.

FIGS. 4 and 5 show a control algorithm according to a preferred embodiment of the present invention. In view of the fact that curved travel control is essential in diverging sections and merging sections, such control is included as curved section control in the following description. Also, the range in which travel permission is required in a curved section will be referred to as the blocking area, and FIGS. 4 and 5 show processing performed by the ground controller. When a request for a travel permission for a curved section is received (step 1), the ground controller checks whether or not a leading vehicle exists in the blocking area (step 2), and provides the first travel permission if a leading vehicle does not exist (step 3). The first travel permission indicates that travel at the speed limit is permitted in the curved section. When an overhead travelling vehicle leaves the blocking area, it makes a report to that effect to the ground controller. When the ground controller receives this report (step 7), it cancels the travel permission. The ground controller manages travel permissions in the blocking area, and it is understood that an overhead travelling vehicle having the first travel permission ceased to exist by canceling the travel permission.

In the case where a leading vehicle exists in step 2, if the travelling directions of the following vehicle and the leading vehicle are different, a travel permission for the blocking area is not provided, and the following vehicle is caused to wait (steps 4 and 6). If the travelling directions are the same, a permission to travel in the blocking area with a lower speed than the first travel permission is provided (steps 4 and 5). If there is only one type of permission for travelling with a reduced speed, it is called the second travel permission, and if there are multiple types, they are called the second travel permission, the third travel permission, and the like, and for example, the farther back an overhead travelling vehicle is in the succession, the lower the speed with which it is allowed to travel is. The second travel permission and the like are provided to allow travelling with a lower speed than the first travel permission such that even if detection by the obstacle sensor for curved travel is delayed, interference with the leading vehicle is reliably avoided.

Although not shown in FIGS. 4 and 5, the speed with which the following vehicle travels in the curved section may be changed according to the history of the obstacle sensor for curved travel. For example, the ground controller manages the number of times that interference with a leading vehicle occurred in a curved section or the number of times that rapid speed reduction was performed in a curved section relative to the total travelling distance, total number of trips, or total travelling time in the past. A configuration is possible in which the higher the number of times that interference occurred or the number of times that rapid speed reduction was performed in a curved section is, which has been normalized by an element such as the total travelling distance, the lower the speed of travel is in the permission when travel permission is provided during travelling as a following vehicle, and the lower these numbers of times are, the higher the speed of travel is in the permission.

When the leading vehicle farthest ahead leaves the blocking area (step 8), the risk of interference is eliminated, and therefore the travel permission of the subsequent travelling vehicle is raised, such as raising the second travel permission to the first travel permission (step 9). When the following vehicle leaves the blocking area (step 10), the travel permission for the blocking area is canceled.

FIG. 5 shows statuses of overhead travelling vehicles in a curved section. The status "wait" for the case where the travelling direction is different from the leading vehicle is a status for only the diverging section and the merging section, and the types of travel permission include "first travel permission" and "low-order travel permission". The first travel permission is provided to the leading vehicle that is to travel in the curved section (blocking area). When the leading vehicle leaves the curved section and the following vehicle becomes the leading vehicle in the curved section, the low-order travel permission is changed to the first travel permission. If a leading vehicle is travelling in a curved section (travel permission has been provided to a leading vehicle), the following vehicle is provided the low-order travel permission and allowed to travel with a reduced speed, thus preventing interference with the leading vehicle or the like.

As described above, according to various preferred embodiments of the present invention, it is possible for multiple travelling vehicles to travel in one curved section at the same time, thus preventing congestion in the curved section.

Also, giving low-order travel permission to the following travelling vehicle prevents interference with the leading travelling vehicle and the like.

When the leading travelling vehicle leaves the curved section, the following travelling vehicle is allowed to travel at a higher speed by changing the low-order travel permission to the first travel permission.

According to the above, it is possible to improve the article carrying efficiency.

Although control using the first travel permission and the second travel permission preferably is performed on all simple curved sections, diverging sections, and merging sections in the preferred embodiments of the present invention, the control of the preferred embodiment may be performed on only diverging sections, or only diverging sections and merging sections, for example. For example, a configuration is possible in which, in simple curved sections, exclusion control is not performed and travelling vehicles are uniformly caused to travel with a reduced speed corresponding to the second travel permission.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A travelling vehicle system comprising:
a travelling route;
a ground controller; and
travelling vehicles configured to travel in a section including a curve in the travelling route under control of the ground controller; wherein
the travelling vehicles are configured to travel along the travelling route, include an obstacle sensor and a communication unit configured to communicate with the ground controller, and are configured or programmed to make a request for a travel permission to the ground controller via the communication unit before travelling in the section including a curve;
the ground controller is configured or programmed to control travelling of the travelling vehicles and includes:
a memory in which a travel permission for the section including a curve that has already been provided to the travelling vehicle is stored, and from which the travel permission is deleted when the travelling vehicle leaves the section; and
a travel permission unit configured or programmed to, when a request for a permission to travel in the section is received from one of the travelling vehicles, reference the memory, provide a first travel permission if a permission to travel has not been provided to another one of the travelling vehicles, and provide a low-order travel permission that permits travel with a lower speed than the first travel permission if a permission to travel has been provided to another one of the travelling vehicles;
the traveling vehicles are configured to enter the section including a curve when the ground controller has provided the first travel permission or the low-order travel permission;
the traveling vehicles are configured to wait to enter the section including a curve when the ground controller has not provided the first travel permission or the low-order travel permission; and
when a travelling vehicle that is farthest ahead in the section has been provided with the first travel permission by the ground controller and a travelling vehicle following the farthest ahead travelling vehicle in the section has been provided with the low-order travel permission by the ground controller, the travelling vehicle with the low-order travel permission is configured to monitor a travelling vehicle ahead of the travelling vehicle with the low-order travel permission in the section by the obstacle sensor of the travelling vehicle with the low-order permission in the section.

2. The travelling vehicle system according to claim 1, wherein the travel permission unit is configured or programmed to, when the travelling vehicle farthest ahead in the section leaves the section, change the travel permission for the travelling vehicle immediately following the farthest ahead travelling vehicle in the section to the first travel permission.

3. The travelling vehicle system according to claim 1, wherein
the ground controller includes a storage device configured to, for each of the travelling vehicles, store a frequency of interferences with leading vehicles or rapid speed reductions in sections; and
the travel permission unit is configured or programmed to, when providing the low-order travel permission, provide a travel permission with a lower speed when the frequency is high, and provide a travel permission with a higher speed when the frequency is low.

4. The travelling vehicle system according to claim 1, wherein the section including a curve is a diverging section or a merging section, and the travel permission unit is configured or programmed to not provide the low-order travel permission when a request for a travel permission to a different side from the other travelling vehicle in the diverging section is received, or when a request for a travel permission from a different side from the other travelling vehicle in the merging section is received.

5. The travelling vehicle system according to claim 1, wherein:
when the section includes at least three travelling vehicles, each of the at least three travelling vehicles, other than the farthest ahead travelling vehicle, monitors another of the at least three traveling vehicles that it is immediately following in the section by the obstacle sensor.

6. A method of controlling travelling of travelling vehicles in curved sections, to allow the travelling vehicles to travel in a section including a curve in a travelling route under control of a ground controller, the method comprising:
making a request for a travel permission to the ground controller before the travelling vehicle travels in the section including a curve;
monitoring an obstacle in the section with an obstacle sensor; and
stopping or performing speed reduction of the travelling vehicle to avoid interference if an obstacle is detected; wherein
the ground controller is configured or programmed to:
store in a memory a travel permission for the section including a curve that has been already provided to the travelling vehicle, and delete the travel permission from the memory when the travelling vehicle leaves the section; and
when a request for a permission to travel in the section is received from one of the travelling vehicles, reference the memory, provide a first travel permission if a permission to travel has not been provided to another one of the travelling vehicles, and provide a low-order travel permission that permits travel with a lower speed than the first travel permission if a permission to travel has been provided to another one of the travelling vehicles;
the traveling vehicles are configured to enter the section including a curve when the ground controller has provided the first travel permission or the low-order travel permission;
the travelling vehicles are configured to wait to enter the section including a curve when the ground controller has not provided the first travel permission or the low-order travel permission; and
when a travelling vehicle that is farthest ahead in the section has been provided with the first travel permission by the ground controller and a travelling vehicle following the farthest ahead travelling vehicle in the section has been provided with the low-order travel permission by the ground controller, the travelling vehicle with the low-order travel permission is configured to monitor a travelling vehicle ahead of the travelling vehicle with the low-order travel permission in the section by the obstacle sensor of the travelling vehicle with the low-order permission in the section.

7. The method of controlling travelling of travelling vehicles according to claim 6, wherein:
when the section includes at least three travelling vehicles, each of the at least three travelling vehicles, other than the farthest ahead travelling vehicle, monitors another of the at least three traveling vehicles that it is immediately following in the section by the obstacle sensor.

* * * * *